United States Patent [19]
Wang et al.

[11] Patent Number: 5,109,080
[45] Date of Patent: Apr. 28, 1992

[54] HIGH REFRACTIVE-INDEX CERAMIC/POLYMER HYBRID MATERIAL

[75] Inventors: Bing Wang; Garth L. Wilkes, both of Blacksburg, Va.

[73] Assignee: Virginia Tech Intellectual Properties, Inc., Blacksburg, Va.

[21] Appl. No.: 441,493

[22] Filed: Nov. 27, 1989

Related U.S. Application Data

[63] Continuation-in-part of Ser. No. 418,367, Oct. 6, 1989, abandoned.

[51] Int. Cl.$^5$ .................................................. C08F 283/00
[52] U.S. Cl. ...................................... 525/534; 525/471; 525/535; 252/315.01; 252/315.1
[58] Field of Search ................ 525/471, 534, 535; 252/315.01, 315.1

[56] References Cited

U.S. PATENT DOCUMENTS 4,715,999 12/1987 Dislich et al. ........................ 264/1.1

OTHER PUBLICATIONS

Huang et al., ACS Symposium, 1987, pp. 354–375.
H. Dislich, "Plastics as Optical Materials", Angew. Chem. Int. Ed. Engl. 18, 45–59 (1979).
B. Lintner et al., "A First Look at the Optical Properties of Ormosils", J. Non-Crystalline Solids 100 (1988), pp. 378–382.

*Primary Examiner*—Melvyn I. Marquis
*Attorney, Agent, or Firm*—Richard P. Fennelly; Louis A. Morris

[57] ABSTRACT

New hybird materials prepared by incorporating a metal alkoxide sol, which is adapted to yield a high refractive-index metal oxide (e.g., titanium dioxide or zirconium dioxide), with a high refractive-index organic polymeric component (e.g., a triethoxysilane-capped poly(arylene ether) ketone or poly(arylene ether) sulfone) have been developed by the sol-gel method. The final products are transparent and display a high refractive index ($n_D=1.60-1.76$). The refractive index of these hybrid materials has a linear relationship with the metal oxide content.

10 Claims, 6 Drawing Sheets

POLY(ARYLENE ETHER) KETONE
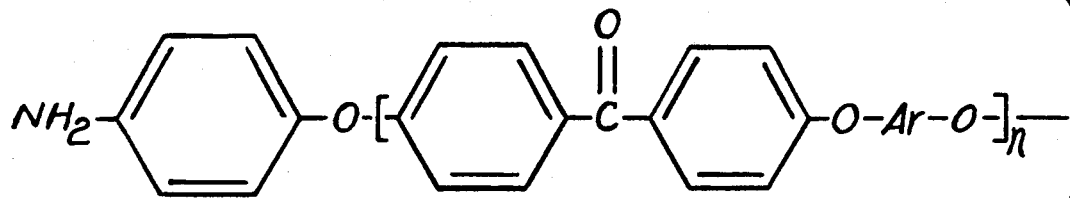
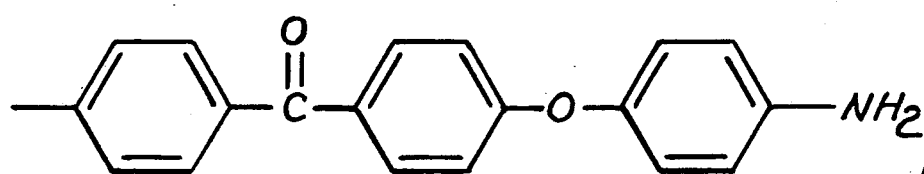
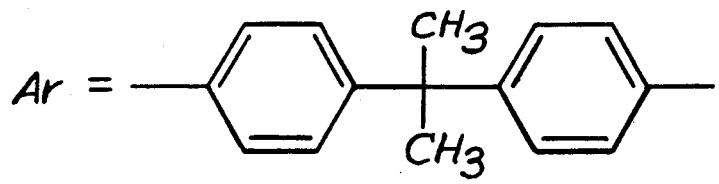
*FIG. 1*
POLY(ARYLENE ETHER) SULFONE
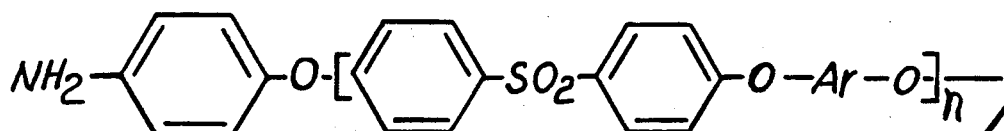
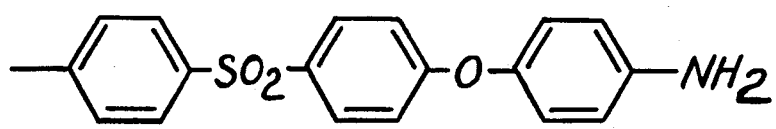
*FIG. 2*
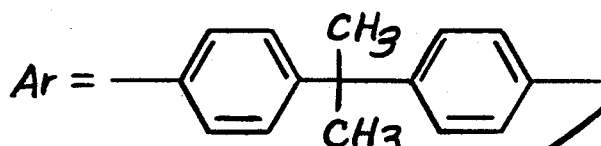

HIGH REFRACTIVE-INDEX CERAMIC/POLYMER HYBRID MATERIAL

This is a continuation-in-part of U.S. Ser. No. 418,367, filed Oct. 6, 1989 and now abandoned.

BACKGROUND OF THE INVENTION

It is sometimes important for coatings and optical systems to contain transparent, high refractive-index materials. The use of high refractive-index materials, for example, allows for the manufacture of thinner lenses with substantially the same optical characteristics.

Certain disclosures exist in the prior art relating to transparent, high refractive-index glass systems that do not contain an organic polymeric component. For example, Japanese Patent Publication No. 63/190,733 describes a high refractiveindex glass obtained by a cation exchange procedure. Japanese Patent Publication No. 61/163,167 describes high refractive index and good near-ultraviolet transmittance optical glass obtained from a mixed oxide system. Japanese Patent Publication No. 61/163,168 describes cadmium-thorium free optical glass obtained from mixed oxides.

Jurek and McGrath in Polym, Prep. 26(2), 283(1985) describe amine-terminated poly(arylene ether) sulfone and poly(arylene ether) ketone compositions. This reference, however, is limited to organic polymeric systems that contain no inorganic components.

SUMMARY OF THE INVENTION

A series of new hybrid materials has been formed by combining (1) a metal alkoxide sol which, when hydrolyzed, forms a highly refractive metal oxide with (2) a high refractive-index organic polymeric component reactive with the metal alkoxide, followed by the step of forming the hybrid materials by the sol-gel process. The final products are transparent and have a high refractive index ($n_D$=1.60-1.76). The refractive index of the hybrid materials display a linear relationship with metal oxide content.

BRIEF DESCRIPTION OF THE DRAWINGS

The instant invention is further illustrated by the Drawings described below which form a portion of the instant Specification wherein:

FIG. 1 is a schematic which depicts the general structure of a poly(arylene ether) ketone (PEK) component which can be used herein;

FIG. 2 is a schematic which depicts the general structure of a poly(arylene ether) sulfone (PSF) component useful herein;

DETAILED DESCRIPTION OF THE PRESENT INVENTION

Figure 3:
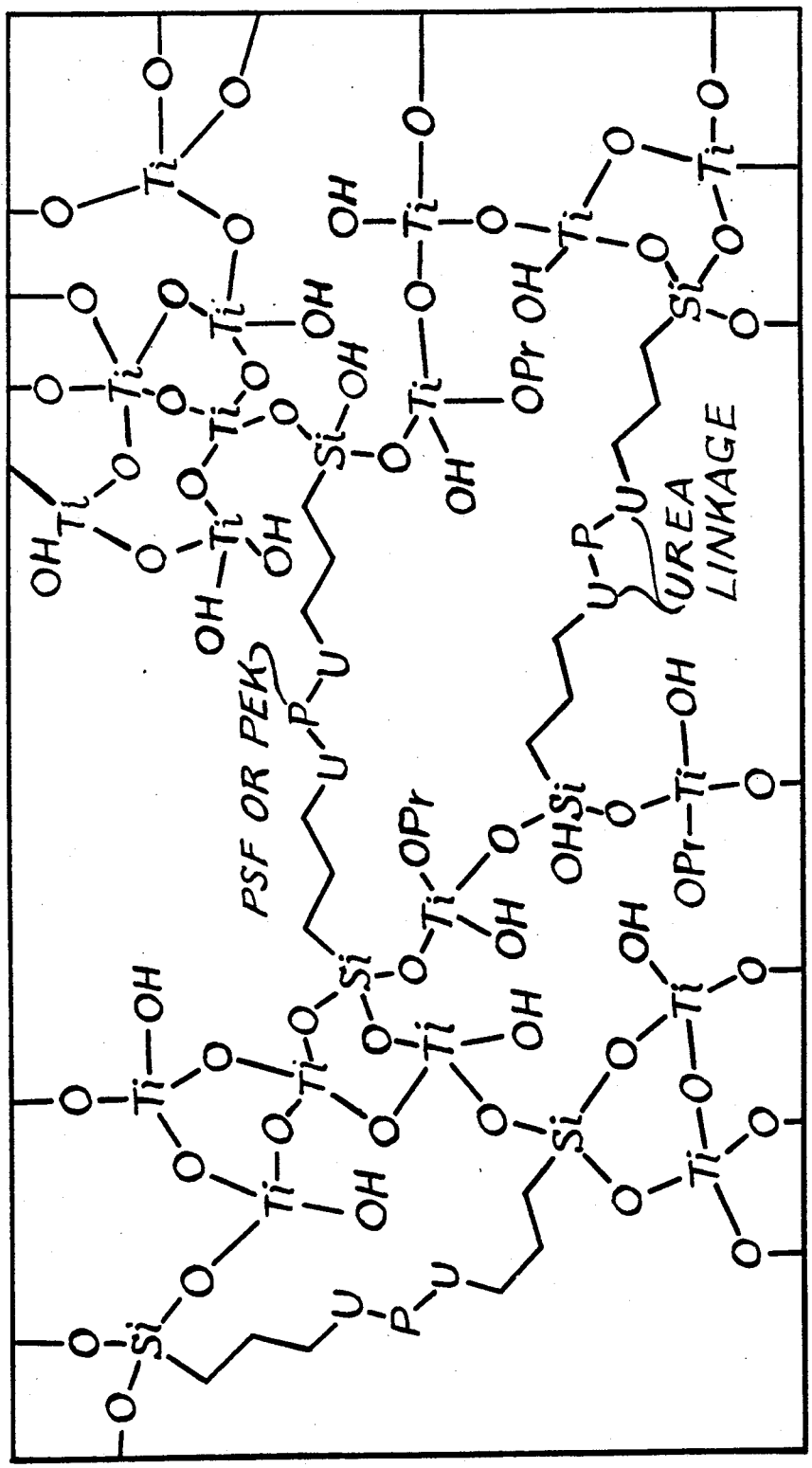
FIG. 3 is a schematic which depicts a suggested general network model of either the Ti-PSF or Ti-PEK network.
Figure 4:
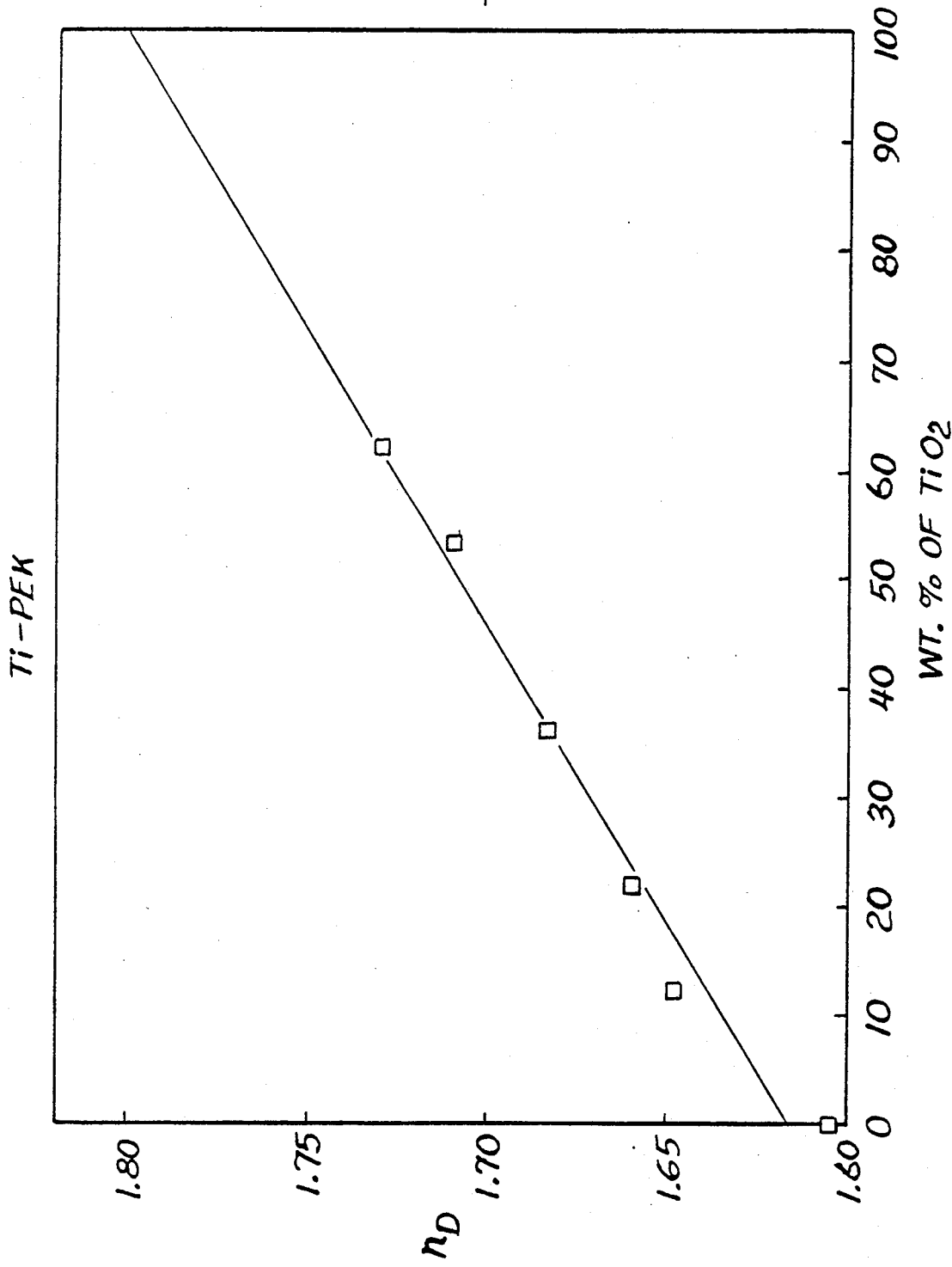
FIG. 4 is a refractive-index plot of various Ti-PEK hybrid materials versus $TiO_2$ content.
Figure 5:
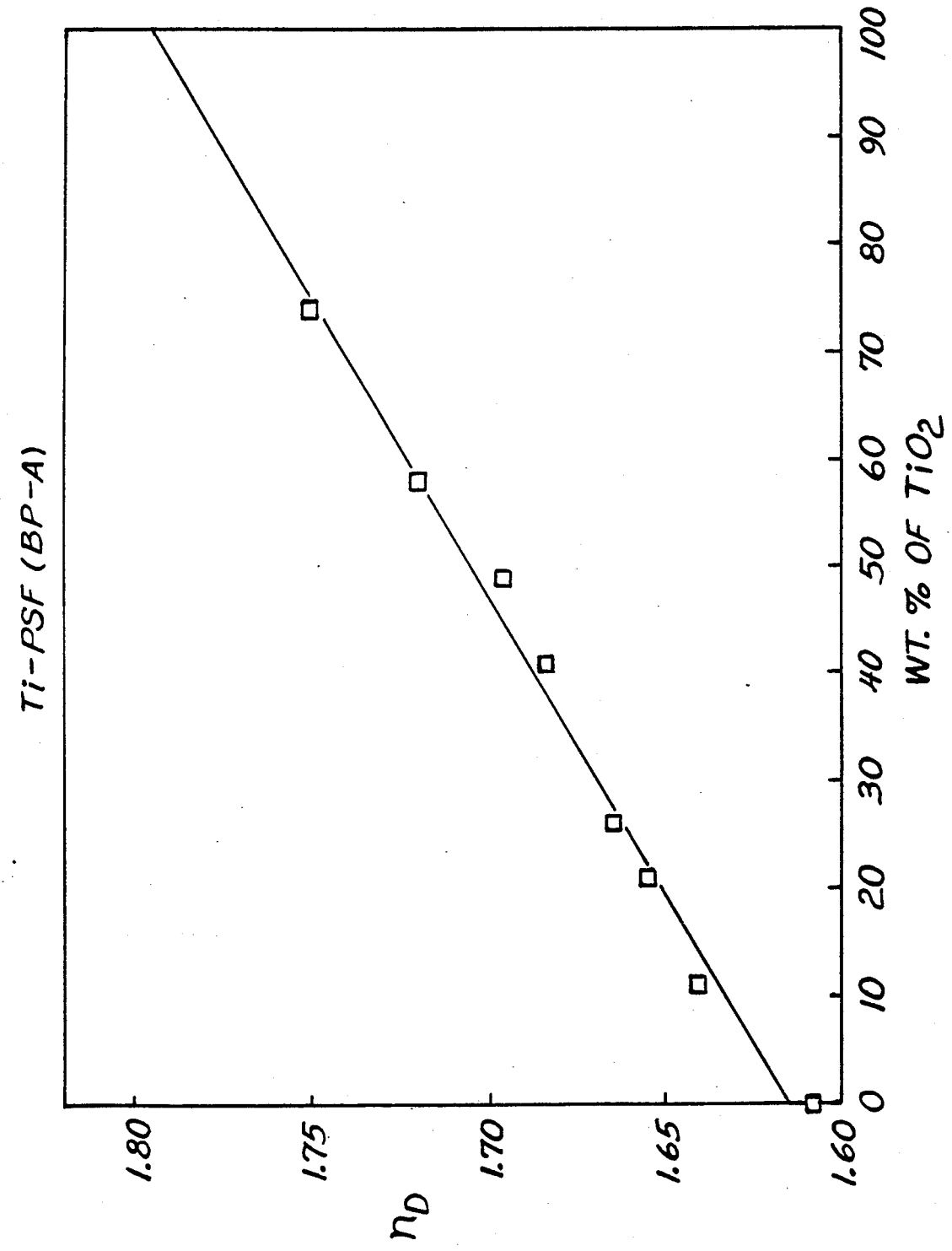
FIG. 5 is a refractive-index plot of various Ti-PSF hybrid materials versus $TiO_2$ content.
Figure 6:
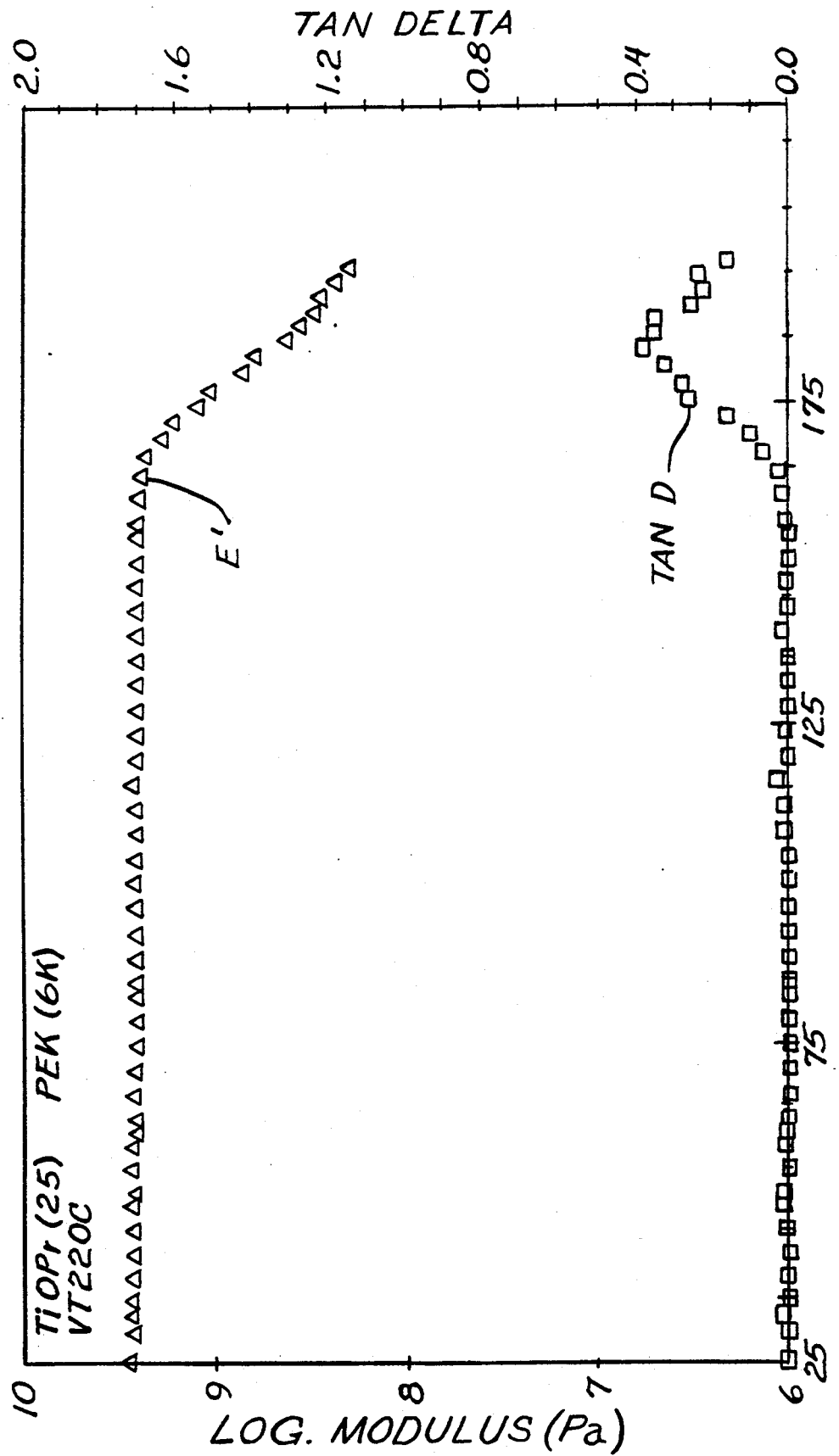
FIG. 6 is a plot of the dynamic mechanical results for one of the Ti-PEK systems derived from 25 wt % titanium isopropoxide and 6,000 molecular weight PEK annealed at 220° C.
Figure 7:
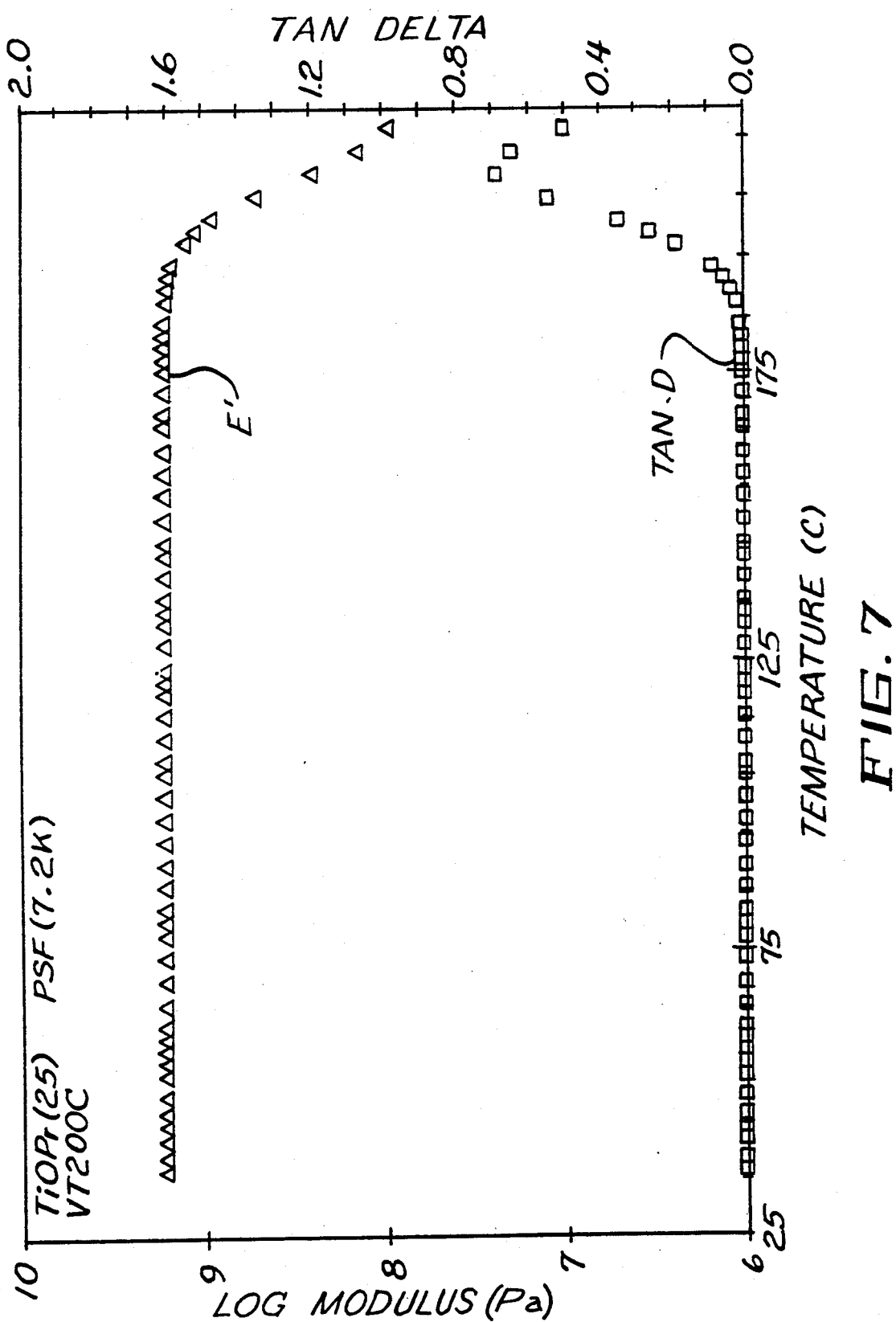
FIG. 7 is a plot of the dynamic mechanical results for one of the Ti-PSF systems derived from a similar weight amount of titanium isopropoxide and 7,200 molecular weight PSF annealed at 200° C.

The instant novel hybrid systems are formed by the sol-gel synthesis of a metal alkoxide (e.g., a titanium or zirconium alkoxide), which if hydrolyzed forms a high refractive-index metal oxide, with a functionalized organic polymer component reactive with the alkoxide, which organic polymer component also has a relatively high refractive index. Functionalized (e.g., trialkoxysilane-capped) poly(arylene ether) materials form a preferred class of organic component. The functionalized poly(arylene ether) ketone and functionalized poly(arylene ether) sulfone materials (abbreviated "PEK" and "PSF") are preferred types of poly(arylene ether) materials which can be selected for use. FIG. 1 shows a representative amineterminated PEK material before functionalization. The repeat unit "n" can vary from about 5 to about 20. FIG. 2 shows an analogous PSF material and "n" therein can vary from about 5 to about 20. The hybrid systems of this invention can contain from about 10% to about 90%, by weight, inorganic component derived from the aforementioned type of metal alkoxide and from about 90% to about 10%, by weight, of the functionalized, highly refractive polymeric component. The refractive index ($n_D$) of the polymeric component itself can range from about 1.60 to about 1.64 whereas the index of refraction for the metal oxide component itself can range from about 1.8 to about 2.5.

The selected polymeric component (e.g., either PEK or PSF) can be appropriately functionalized by reaction of amine-terminated PEK or PSF with an isocyanatoalkyltrialkoxysilane as shown in Examples 1 and 2 hereinbelow. The amine functionality on the PEK or PSF materials reacts with the isocyanato moiety on the alkoxysilane thereby bonding the latter to the former by an intermediate urethane linkage. The resulting alkoxysilane-capped polymer material can then be bonded to the selected metal alkoxide by sol-gel procedures, preferably using the addition of acid to prevent precipitation when the metal alkoxide chosen has a relatively faster reaction rate than the high refractive-index organic component as described in more detail in U.S. Ser. No. 418,367, filed Oct. 6, 1989, which is incorporated herein by reference. Examples 3 and 4 hereinbelow illustrate the synthesis procedure for making certain hybrid materials in accordance with this invention.

The present invention is further illustrated by the Examples which follow.

EXAMPLE 1

This illustrates the preparation of triethoxysilane-capped poly(arylene ether) ketone (PEK).

First, 10 g of poly(arylene ether) ketone with amine end groups and a molecular weight of 6,000, was dissolved in 100 ml of THF under nitrogen and was stirred. Next, 1.03 g (1.25 eq mole) of 3-isocyanatopropyltriethoxysilane was slowly added to the solution The solution was stirred under nitrogen at room temperature for 3 hours, then 200 ml of absolute ethanol was added to the solution to precipitate triethoxysilane-capped poly(arylene ether) ketone. After filtering, the final solid product was dried under vacuum at room temperature.

EXAMPLE 2

This illustrates the preparation of triethoxysilane-capped poly(arylene ether) sulfone (PSF).

First, 10 g of poly(arylene ether) sulfone with amine end groups and a molecular weight of 7200, was dissolved in 100 ml of THF under nitrogen with stirring. Next, 0.86 g (1.25 eq mole) of 3-isocyanatopropyltriethoxysilane was slowly added to the solution. The solution was stirred under nitrogen at room temperature for 3 hours, then 200 ml of absolute ethanol was added to the solution, and the triethoxysilane-capped poly(arylene ether) sulfone precipitated from solution. After filtering, the final solid product was dried under vacuum at room temperature.

EXAMPLE 3

This illustrates the preparation of a Ti-PEK hybrid material in accordance with the present invention.

First, 0.1 ml of HCl (10N), and 5 g of THF were mixed together in a flask. Then the solution was transferred to an addition funnel. Next, the HCl-containing THF solution was slowly added to a polypropylene flask, which contained 5 g of titanium isopropoxide. In order to avoid local inhomogeneity, a slow addition rate of the HCl-containing THF solution and a fast stirring rate were utilized. After adding the HCl-containing THF solution, a clear titania sol (pH =2.2) was formed. The solution was kept at room temperature for 24 hours. Then a solution containing an appropriate amount (e.g., 75 wt% based on the titanium content) of triethoxysilane-capped poly(arylene ether) ketone in 10x ml of THF was mixed with the titania sol and was stirred for 5 minutes to obtain a homogeneous system. The final solution was cast into petri dishes and was covered for further drying and curing at room temperature. Films could later be removed from the dishes after 12 hours and were annealed (e.g., at 220° C.) for 15 minutes to complete the curing.

EXAMPLE 4

This illustrates the preparation of Ti-PSF hybrid materials.

First, 0.1 ml of HCl (10N), and 5 g of THF were mixed together in a flask. Then the solution was transferred to an addition funnel. Next, the HCl-containing THF solution was slowly added to a polypropylene flask, which contained 5 g of titanium isopropoxide. In order to avoid local inhomogeneity, a slow addition rate of the HCl-containing THF solution and a fast stirring rate were utilized After adding the HCl-containing THF solution, a clear titania sol (pH=2.2) was formed. The solution was kept at room temperature for 24 hours. Then a solution containing an appropriate amount (e.g., as defined in Example 3) of triethoxysilane-capped poly(arylene ether) sulfone in 10x ml of THF was mixed with the titania sol and was stirred for 5 minutes to obtain a homogeneous system. The final solution was then cast into petri dishes and was covered for further drying and curing at room temperature. Films could be removed from the dishes after 12 hour and were annealed at 200° C. for 15 minutes to complete the curing.

The foregoing Examples illustrate certain embodiments of the instant invention and should not therefore be construed in a limiting sense. The scope of protection that is sought is set forth in the claims which follow.

We claim:

1. A high refractive-index ceramic/polymer hybrid material, having a refractive index of from 1.60 to 1.76, formed by the sol-gel synthesis of a metal alkoxide and an alkoxysilane-capped poly(arylene ether) polymeric component reactive therewith.

2. A material as claimed in claim 1 wherein the metal alkoxide is selected from the group consisting of a titanium alkoxide and a zirconium alkoxide.

3. A material as claimed in claim 1 wherein the metal alkoxide is a titanium alkoxide.

4. A material as claimed in claim 1 wherein the polymeric component is an alkoxysilane-capped poly(arylene ether) ketone.

5. A material as claimed in claim 1 wherein the polymeric component is an alkoxysilane-capped (arylene ether) sulfone.

6. A material as claimed in claim 4 wherein the metal alkoxide is a titanium alkoxide.

7. A material as claimed in claim 5 wherein the metal alkoxide is a titanium alkoxide.

8. Material as claimed in claim 1 which comprises from about 10% to about 90%, by weight of a metal oxide component derived from a metal alkoxide selected from the group consisting of a titanium alkoxide and a zirconium alkoxide and from about 90% to about 10%, by weight of a trialkoxysilane-capped poly(arylene ether) polymeric component.

9. A material as claimed in claim 8 wherein the poly(arylene ether) is a poly(arylene ether) ketone.

10. A material as claimed in claim 8 wherein the poly(arylene ether) is a poly(arylene ether) sulfone.

* * * * *